Aug. 13, 1963   L. H. FOSTER ETAL   3,100,383
CONTROL FOR REFRIGERATORS INCLUDING ALARM MEANS
Filed May 23, 1961                               2 Sheets-Sheet 1

INVENTORS
LAWRENCE H. FOSTER
HAROLD E. BUSH
BY
Curtis, Morris & Safford
ATTORNEYS Aug. 13, 1963 L. H. FOSTER ETAL 3,100,383
CONTROL FOR REFRIGERATORS INCLUDING ALARM MEANS
Filed May 23, 1961 2 Sheets-Sheet 2

INVENTORS
LAWRENCE H. FOSTER
HAROLD E. BUSH
BY
Curtis, Morris & Safford
ATTORNEYS United States Patent Office 3,100,383
Patented Aug. 13, 1963

3,100,383
CONTROL FOR REFRIGERATORS INCLUDING
ALARM MEANS
Lawrence H. Foster, Scarsdale, and Harold E. Bush, Hudson, N.Y., assignors to Foster Refrigerator Corp., Hudson, N.Y., a corporation of New York
Filed May 23, 1961, Ser. No. 112,095
5 Claims. (Cl. 62—125)

The present invention relates to an ambient controlled apparatus for storing perishable materials and more particularly to a control system having a sensing element which tends to simulate the thermal condition of materials being stored.

Most controls used in or in conjunction with, for example, refrigeration are responsive to the air temperature which does not necessarily have any direct relation to the actual temperature of the materials being refrigerated. When the cooling system is off, the air temperature in a refrigerator will rise faster than the temperature of the materials being refrigerated. Conversely, when the cooling system is on, the air temperature will fall faster than the temperature of the materials. These differences in temperature are due to the difference in the specific heats of the air and materials to be refrigerated, and the temperature of the latter always lags any changes in the temperature of the air.

While such conventional controls operate satisfactorily for most uses, they do not respond to the true thermal condition of the materials to be refrigerated. Thus, it is possible under certain operating conditions for the controls to indicate temperature conditions which are not a true indication of the temperature of the materials being refrigerated. However, it is often desirable to monitor the operation of a refrigeration or other ambient controlled apparatus to immediately indicate a power failure, or true temperature trends of the materials which might adversely affect their condition.

One of the objects of the present invention is to provide a sensing element for an ambient controlled apparatus having thermal characteristics which tend to simulate the actual temperature of edible food stuffs or other materials being stored or processed.

Another object is to provide a control in a refrigerator for indicating either a power failure or temperatures above or below a normal operating temperature range at which the materials in the refrigerator would be adversely affected.

Another object is to provide a signalling system for indicating an abnormal operating condition in a refrigerator which operates independently of the power source for the mechanical refrigeration system of the refrigerator.

Still another object is to provide a signalling system for monitoring the operation of an ambient controlled apparatus which is of simple and compact construction, adapted for economical manufacture, reliable in operation and one which will assist in diagnosing a malfunction and thereby facilitate and expedite repair.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

Figure 1:
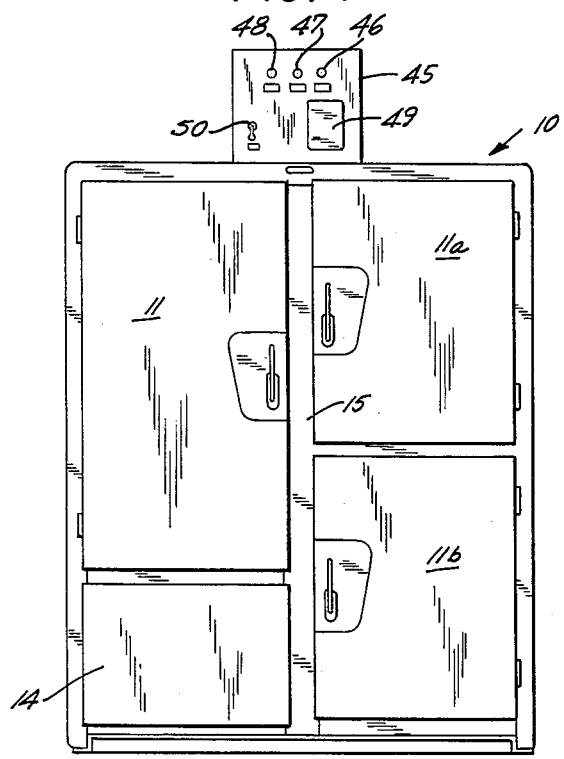
FIGURE 1 is a front elevational view of a refrigerator incorporating the novel features of the present invention including a monitor panel shown mounted on the top thereof.
Figure 2:
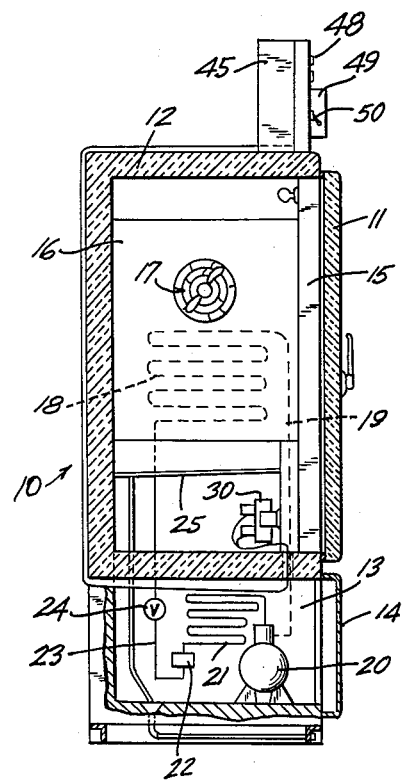
FIGURE 2 is a sectional view of the refrigerator in side elevation and showing the mechanical refrigeration system and the sensing mechanism of the control for the monitor panel.
Figure 3:
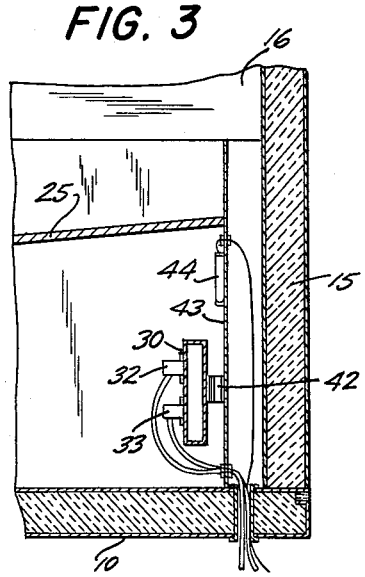
FIGURE 3 is a sectional detail view showing the location of the sensing elements of the controls for the mechanical refrigeration system and monitor panel.

The present invention is shown applied to a refrigerator 10, illustrated in FIGURES 1 to 3 in the drawings, having separate compartments closed by separate doors 11, 11a and 11b. It will be understood, however, that the invention may be applied to refrigerators having a greater or lesser number of compartments or any other ambient controlled apparatus for storing perishable materials, such as biologicals, chemicals, human tissue banks or the like or for processing materials or foods. As shown in FIGURE 2, the refrigerator cabinet has insulated walls 12 provided with door openings for the compartments which are opened and closed by the doors 11, 11a and 11b, respectively. A machine compartment 13 underlies one of the compartments and is closed at the front by a door 14. The refrigerator cabinet also has a mullion 15 at the front and a hollow partition wall 16 at the rear of the mullion for dividing the interior of the refrigerator into the separate compartments. Partition wall 16 between adjacent compartments has openings at the top and bottom through which air is circulated by a fan or fans 17 in an opening or openings in the wall.

Air circulated by the fan 17 is cooled by an evaporator coil 18 in the hollow partition wall 16 and comprising a part of a mechanical refrigerating system for cooling the interior of the refrigerator. One end of the evaporator coil 18 is connected by a line 19 to the suction side of a compressor 20. As shown in FIGURE 2, the high pressure side of the compressor 20 is, in turn, connected to a condenser 21 and the outlet from the condenser is connected to a receiver 22 in the refrigerating circuit. The refrigerating circuit is completed by a line 23 connecting the accumulator 22 to the evaporator coil 18 and the line includes an expansion valve 24. As shown in FIGURES 2 and 3, a drain pan 25 underlies the evaporator coil 18 and both the evaporator coil 18 and drain pan 25 are located at the rear of the mullion 15 between adjacent compartments. As thus far described, the refrigerator is of conventional construction.

In accordance with the present invention, a control is provided with a sensing mechanism 30 in the refrigerator having thermal characteristics which tend to simulate the temperature of the food products or other materials stored in the cabinet 10. The sensing mechanism 30 may be used in an electric control system for controlling operation of the compressor 20 of the mechanical refrigeration system. In some control systems, it may be desirable to exactly simulate the average specific heat of the materials to be refrigerated, and in other control systems, it may be desirable to provide a substance having a greater or lesser specific heat than the materials to be refrigerated. However, for purposes of illustration, the sensing mechanism 30 is shown applied to a novel signalling system for monitoring the operation of a refrigerator.

Figure 5:
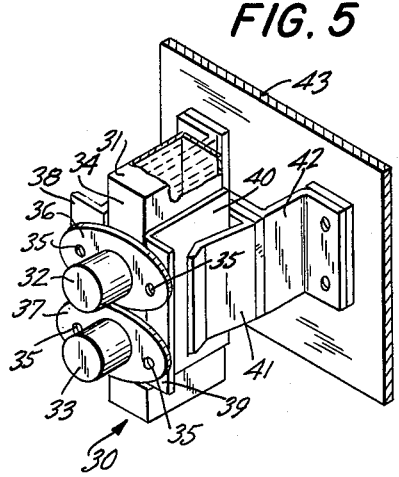
FIGURE 5 is an enlarged prospective view of the sensing mechanism of the control which simulates the temperature of materials being refrigerated.

As shown in FIGURES 2, 3 and 5, the sensing mechanism 30 comprises a tank 31 containing a suitable substance, either solid or liquid, having a specific heat correlated to the specific heat of the materials to be refrigerated. The substance may have thermal characteristics to exactly simulate the average response to temperature changes of the food stuffs or other products being refrigerated, or may have thermal characteristics to simulate materials having a greater or lesser specific heat depending upon the particular control system in which it is used. However, in the illustrated embodiment where the sensing mechanism 30 is used to control a signalling system, a substance is used having a specific heat less than the specific heat of the food stuffs being refrigerated so that it will sense and respond to a temperature trend more quickly than the actual food products. A suitable material for this may, for example, comprise a brine solution containing 25% of salt by weight and having a specific heat of 0.783 B.t.u.'s per pound. Also, the tank 31 is of a size to provide a volume which is comparable with food products to be refrigerated. A tank 31, for example, 3½ inches long, 1½ inches deep and ¾ of an inch thick has been found to operate satisfactorily in a signalling system for indicating a temperature trend in the materials being refrigerated. Preferably, the tank 31 is located at the rear of the mullion 15, see FIGURE 2, and below the drip pan 25 where a minimum temperature variation occurs in the refrigerator.

In the illustrated embodiment a pair of thermally operated electric switches 32 and 33 directly contact one side of the tank 31. As shown in FIGURE 5, each thermally operated switch 32 and 33 is clamped in engagement with the side 34 of the tank 31 by means of screws 35 to engage a thermal responsive element, such as an expansible bellows, therewith. The screws 35 extend through flanges 36 and 37 on the switch housings and into flanges 38 and 39 of a yoke 40 embracing three sides of the tank. The yoke 40, in turn, is frictionally mounted in a clip 41 attached to a bracket 42 secured to a wall 43 of the refrigerator 10 at the rear of the mullion 15. In the particular embodiment of the invention, as illustrated in the drawings, the thermally operated switch 32 is adapted to close at a particular high temperature while the switch 33 is adapted to close at a particular low temperature above and below the temperature to be maintained.

As shown in FIGURE 3, a sensing element 44 of a conventional control for the refrigeration system is provided adjacent the sensing mechanism 30 at the rear of the mullion 15. Variations in air temperatures operate through the sensing element 44 to start and stop the refrigeration system as required and independently of the sensing mechanism 30 which responds to simulated changes in the temperature of the materials being refrigerated and lags changes in the air temperature in the refrigerator.

Figure 4:
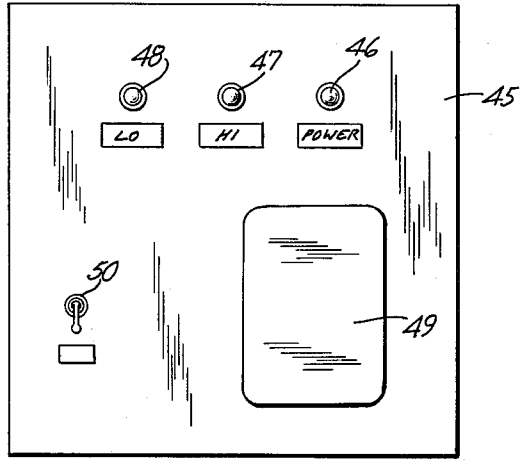
FIGURE 4 is an enlarged front view of the monitor panel illustrated in FIGURE 1.

In addition to providing a temperature responsive mechanism in an electric control which simulates the temperature conditions of materials to be refrigerated, the present invention also provides a novel signalling system for monitoring the operation of the refrigerator and utilizing the temperature responsive mechanism. The particular signalling system comprises a monitoring panel 45, as illustrated in FIGURES 1, 2 and 4 positioned on the top of the refrigerator. The monitoring panel 45 comprises an electric lamp 46 of one color for indicating whether or not power is being supplied to operate the refrigerating system; a lamp 47 of a different color for indicating a predetermined high temperature condition; a lamp 48 of still another color for indicating a low temperature condition; an audible alarm 49 which operates when any of the above mentioned abnormal conditions occurs; and a manually operable switch 50 for turning off the audible alarm. For example, the lamp 46 may be colored red which is lighted at all times except when there is a power failure. The lamp 47 may be of amber color which flashes on only when a predetermined high temperature occurs in the refrigerator which would cause food products in the refrigerator to spoil. The lamp 48 may be green and flashes on only when a predetermined low temperature occurs in the refrigerator which will cause the food products in the refrigerator to freeze. The audible alarm 49 may be in the form of an electric buzzer or bell and is energized to produce an audible alarm whenever the power fails or abnormal temperatures occur. The shut off switch 50 is connected in series with the audible alarm 49 and may be manually operated to stop the alarm after the abnormal condition has been indicated and called to the attention of an attendant.

Figure 6:
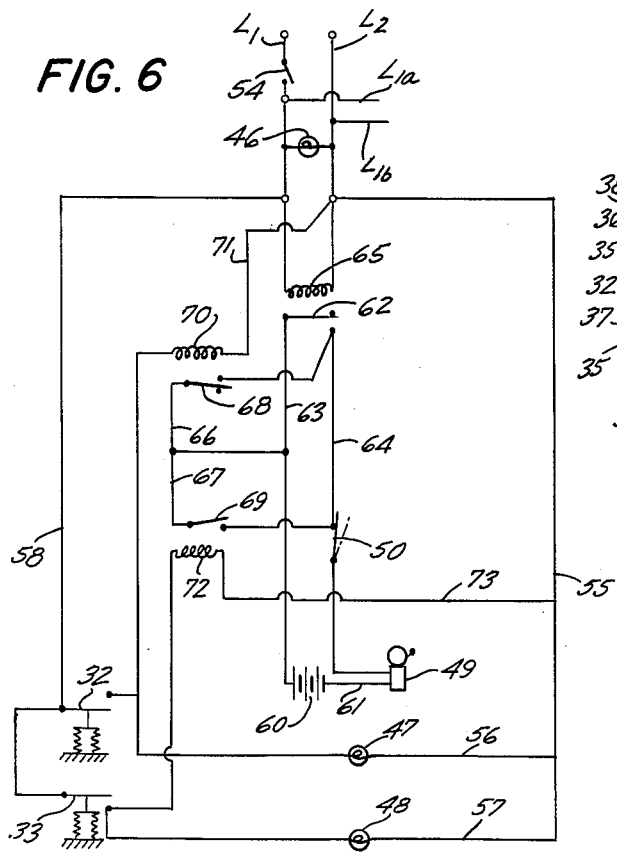
FIGURE 6 is a diagrammatic view of the electric signalling circuit used for the monitor panel and showing the thermal switches for indicating high and low temperatures.

The sensing mechanism 30 and signalling elements 46 to 50 are connected in an electric signalling circuit illustrated in FIGURE 6. The circuit comprises a source of power illustrated as power lines L1 and L2 and branch lines L1a and L1b to supply electric current from the power lines to the motor driven compressor of the refrigerating system. A manually operable switch 54 is provided in line L1 to control operation of the refrigerator. Lamp 46 of the signalling system is connected across the power lines L1 and L2 so that the lamp is continuously lighted when the refrigerator is in operation except when there is a power failure. A conductor 55 connects one side L2 of the power source to branch circuits 56 and 57 containing the lamps 47 and 48, respectively. The branch circuit 56 is completed through the thermally operated switch 32 to the other side of the line L. The branch circuit 57 is completed through the thermally operated low temperature switch 33 and conductor 58 and to the other side of the line L1. Thus, when either switch 32 or 33 is actuated to closed position current is supplied to the particular lamp 47 or 48 in series therewith to indicate an abnormal temperature condition.

In addition, the alarm system comprises a battery circuit for operating the audible alarm 49 independently of the power circuit L1, L2. One side of the battery 60 is connected to the audible alarm device 49 by a conductor 61 and the other side of the battery is connected to a relay switch 62 by a conductor 63 and the other side of the relay switch is connected to the alarm device 49 through a conductor 64 having the shut off switch 50 therein. Relay switch 62 is normally held in open position by a relay coil 65 connected across the power line L1 and L2 which holds the relay switch in open position. Upon failure of power, the relay switch 62 drops to its closed position to complete a circuit through the audible alarm 49. The auxiliary battery operated circuit also includes branches 66 and 67 in parallel with the branch 63 and each of the parallel branches comprises a relay switch 68 and 69 for each of the thermally operated switches 32 and 33. Relay switch 68 is normally open and actuated to a closed position by a relay coil 70 connected in a branch 71 from the main power line L2 in parallel with the branch 56 to thermal switch 32. Relay switch 69 is also normally open and actuated to a closed position by a relay coil 72 in a branch circuit 73 from L2 parallel to the branch circuit 57 to switch 33. One form of the invention having now been described in detail, the mode of operation is explained as follows:

For purposes of description, let it be assumed that the elements 46 to 50 of the monitoring panel 45, as well as the thermal responsive switches 32 and 33, are connected in the signalling system illustrated in FIGURE 6. Further, let it be assumed that the shut off switch 50 is moved to the closed position illustrated in FIGURE 6 and the manual control switch 54 has been closed to initiate operation of the refrigeration system. With a high temperature in the refrigerator 10, the thermal sensing element 44 closes a switch to initiate operation of the compressor 20 which evaporates refrigerant in the evaporator 18 at a low pressure and temperature to cool the air in contact therewith. Fan 17 circulates the air in the refrigerator over the evaporator coil 18 which, in turn, contacts and cools the food stuffs or other materials to be refrigerated. When the interior of the refrigerator 10 has been cooled to a particular temperature for which the control is adjusted, the refrigeration system is stopped. As soon as the temperature rises, the refrigeration system again operates to cool the air, and the system continues to operate in this manner to maintain the desired temperature in the refrigerator.

However, the food stuffs or other materials being refrigerated do not immediately respond to the temperature of the air. Instead, heat gradually flows from the refrigerated food stuffs to the air until the predetermined low temperature is attained. During cycles of the refrigeration system, the air in the refrigerator is cooled below and rises above the temperature of the materials stored in the refrigerator without substantially changing the temperature of the materials.

Upon failure of the power supply, the lamp 46 goes off and relay coil 65, see FIGURE 6, becomes de-energized and drops the relay switch 62 to closed position. Closing of the relay switch 62 completes a circuit from the battery 60 through the conductor 63, switch 62, conductor 64 and shut off switch 50 to energize and operate the audible alarm device 49. Both the lamp 46 and audible alarm 49 calls the attention of an attendant to the fact that the power is off so that repairs may be made before the food stuffs in the refrigerator spoil. After the attendant has been advised of the power failure he may stop the operation of the audible signalling device by opening the shut off switch 50.

If during the operation of the refrigerator 10 its temperature gradually increases to the point where the sensing mechanism 30, which simulates the temperature of food products or other materials being refrigerated, has a temperature above a predetermined value, it operates the high temperature switch 32 to closed position, see FIGURE 6. Upon closure of the high temperature switch 32 a branch circuit 56 is immediately energized to light the lamp 47 which calls an attendant's attention to the abnormally high temperature occurring in the refrigerator 10. Simultaneously, the parallel branch circuit 71 is completed to energize the relay coil 70 and close relay switch 68 and thereby initiate operation of the audible signalling device 49 to be sure that the condition is noted.

On the other hand, if a low temperature occurs in the refrigerator 10 which might cause freezing of the food products therein, the low temperature switch 33 closes to complete branch circuit 57 and light the lamp 48 therein. Simultaneously the low temperature switch 33 energizes the branch circuit 73 and, operating through relay coil 72, closes relay switch 69 to complete the circuit to the audible signalling devices 49. When the fault has been corrected the particular thermal and relay switches are returned to their initial open position. At any time, the switch 50 may be manually actuated to shut off the audible signalling device 49 after the particular abnormal condition has been indicated to the attendant.

It will now be observed that the present invention provides an electric refrigerator control with a sensing mechanism having thermal characteristics which simulate the actual temperature of materials being refrigerated. It will further be observed that the present invention provides a control system for monitoring the operation of a refrigerator to indicate either a power failure or temperatures above or below the normal at which the materials being refrigerated would be adversely affected. It will further be observed that the present invention provides a signalling system for indicating abnormal operating conditions in refrigerators, which operate independently of the power source for operating the mechanical refrigerating system. It will still further be observed that the present invention provides a signalling system for monitoring the operation of a refrigerator which is of simple and compact construction, economical to manufacture and one which is reliable in operation.

While a single embodiment of the invention is herein illustrated and described, it will be understood that changes may be made in the construction and arrangement of elements without departing from the spirit or scope of the invention. Therefore, without limitation in this respect, the invention is defined by the following claims.

We claim.

1. In a refrigerator of the type having a mechanically operated refrigeration system for cooling the refrigerator, a control for indicating operating conditions in the refrigerator comprising, a body in the refrigerator having a specific heat substantially greater than air to generally simulate a temperature trend of a composite of materials to be refrigerated, at least one thermostatically operated switch in thermal contact with said body and operable in response to a particular temperature of said body, a source of electric current comprising a power line, a main electric circuit connected across said electric power line and having a signaling device in the form of a lamp, said thermostatically operated switch connecting the lamp to the electric power line, an auxiliary circuit having a battery, an audible alarm and a relay switch for connecting the audible alarm to the battery, a relay coil in said main circuit for closing the relay switch in the auxiliary circuit for initiating operation of the alarm, and a manually operable switch in the auxiliary circuit to shut off the alarm.

2. In a refrigerator, a source of power comprising an electric power line, a mechanical refrigerating system operated by power from said source for cooling the interior of said refrigerator, a switch operated by a force functionally related to the air temperature in said refrigerator for controlling operation of the mechanical refrigerating system, an alarm circuit having an alarm device and an electric battery operable independently of the first mentioned source of power, a body in said refrigerator having thermal characteristics which simulate a temperature change in materials to be refrigerated, a relay switch in the alarm circuit having an actuating coil in the power line to close the alarm circuit and initiate the alarm device upon failure of power in the power line, a second relay switch in the alarm circuit in parallel with the first mentioned relay switch, a thermostatic switch responsive to changes in a temperature condition of said body and connected to operate the second relay switch to close the alarm circuit and initiate the alarm device.

3. In a refrigerator, a mechanical refrigerating system for cooling said refrigerator, a source of power for operating said refrigerating system, a switch operated by a force functionally related to the air temperature in said refrigerator for controlling operation of the mechanical refrigerating system, a body in said refrigerator having thermal characteristics to simulate the temperature characteristics of the materials to be refrigerated, a first alarm circuit for monitoring the operation of the refrigerator and having a plurality of branches connected in parallel across the power line, one of said branches comprising a lamp to indicate a failure of the source of power, another of said branches including a lamp and a thermal switch responsive to a predetermined high temperature of said body in said refrigerator for lighting the lamp at and above said temperature, another branch including a lamp and a thermal switch in thermal contact with and responsive to a predetermined low temperature of said body for lighting the lamp at and below said low temperature a second alarm circuit having an audible alarm device and an electric battery, a relay switch in the second alarm circuit having an actuating coil connected across the power line and operable to close the second alarm circuit and initiate operation of said audible alarm device upon failure of power in the power line, and relay switches in the second alarm circuit operable in response to closure of each of the thermal switches at predetermined high and low temperatures to initiate operation of the alarm device.

4. A refrigerator in accordance with claim 2 in which the body in the refrigerator is a hollow tank containing a salt solution containing up to 25% by weight of salt.

5. A refrigerator in accordance with claim 1 in which the main circuit has parallel branches, a lamp and thermal switch in each branch, the thermal switch in one branch being operable at a predetermined low temperature to connect the lamp to the power line, the thermostatic switch in the other branch bring operable responsive to a high temperature to connect the lamp therein to the power line, said auxiliary circuit having separate branches connected in parallel to operate the audible alarm, each of the branches of the auxiliary circuit having a relay switch therein, and each of the branches of the main circuit having a relay coil for operating its relay switch in a corresponding auxiliary circuit.

References Cited in the file of this patent

UNITED STATES PATENTS

| | | |
|---|---|---|
| 2,165,569 | Obermaier | July 11, 1939 |
| 2,741,099 | Beane | Apr. 10, 1956 |